(12) United States Patent
Altaparmakov et al.

(10) Patent No.: US 10,776,342 B2
(45) Date of Patent: Sep. 15, 2020

(54) SYSTEMS AND METHODS FOR RECOVERING LOST CLUSTERS FROM A MOUNTED VOLUME

(71) Applicant: Tuxera Inc., Espoo (FI)

(72) Inventors: Anton Ivanov Altaparmakov, Great Chesterford (GB); Sougata Santra, Espoo (FI)

(73) Assignee: Tuxena, Inc., Espoo (FI)

( * ) Notice: Subject to any disclaimer, the term of this patent is extended or adjusted under 35 U.S.C. 154(b) by 371 days.

(21) Appl. No.: 15/814,638

(22) Filed: Nov. 16, 2017

(65) Prior Publication Data

US 2018/0144019 A1 May 24, 2018

Related U.S. Application Data

(60) Provisional application No. 62/424,344, filed on Nov. 18, 2016.

(51) Int. Cl.
*G06F 17/00* (2019.01)
*G06F 16/23* (2019.01)
*G06F 16/22* (2019.01)
*G06F 16/16* (2019.01)
*G06F 16/11* (2019.01)

(52) U.S. Cl.
CPC .......... *G06F 16/2365* (2019.01); *G06F 16/11* (2019.01); *G06F 16/16* (2019.01); *G06F 16/2282* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 7,562,101 B1 * | 7/2009 | Jernigan, IV | ....... | G06F 11/2221 707/687 |
| 7,765,211 B2 * | 7/2010 | Bhattacharjee | ....... | G06F 16/283 707/737 |
| 7,844,584 B1 * | 11/2010 | Griess | ................. | G06F 16/1774 707/704 |
| 8,321,439 B2 * | 11/2012 | Pudipeddi | ............... | G06F 16/22 707/758 |
| 8,595,271 B1 * | 11/2013 | Patwardhan | ............ | G06F 16/11 707/821 |
| 2006/0195730 A1 * | 8/2006 | Kageyama | ............. | G11C 29/70 714/100 |
| 2008/0159211 A1 * | 7/2008 | Kwon | ................. | H04W 72/042 370/329 |
| 2008/0172426 A1 | 7/2008 | Patel et al. | | |
| 2009/0019047 A1 | 7/2009 | Anderson et al. | | |
| 2009/0271412 A1 * | 10/2009 | Lacapra | ................ | H04L 67/104 |
| 2010/0076934 A1 * | 3/2010 | Pershin | ............... | G06F 11/1451 707/640 |

(Continued)

OTHER PUBLICATIONS

International Search Report and Written Opinion for PCT/US2017/062188 dated Feb. 13, 2018, pp. 13.

(Continued)

*Primary Examiner* — Hung D Le
(74) *Attorney, Agent, or Firm* — J. Fish Law, PLLC

(57) ABSTRACT

Techniques for recovering lost clusters are described herein. In particular, this disclosure describes techniques for generating an allocation bitmap. The allocation bitmap may be used to recover lost clusters on a mounted volume.

20 Claims, 10 Drawing Sheets

(56) References Cited

U.S. PATENT DOCUMENTS

| | | |
|---|---|---|
| 2011/0022566 A1 | 1/2011 | Beaverson et al. |
| 2011/0113077 A1 | 5/2011 | Pudipeddi et al. |
| 2011/0153976 A1* | 6/2011 | Tamura ................. G06F 3/0608 711/170 |
| 2012/0167080 A1* | 6/2012 | Vilayannur ........... G06F 3/0608 718/1 |
| 2013/0246366 A1 | 9/2013 | Preslan et al. |
| 2015/0193460 A1 | 7/2015 | Altaparmakov et al. |
| 2016/0085647 A1* | 3/2016 | Ramasubramaniam .................... G06F 11/2033 714/4.12 |
| 2017/0220428 A1* | 8/2017 | Li .......................... G06F 16/25 |

OTHER PUBLICATIONS

Extended European Search Report, Application No. 17872342.5, dated Apr. 10, 2020.

* cited by examiner

SCAN RESULTS

| INODE | 1ST CLUSTER | SIZE | SCANNED |
|---|---|---|---|
| ...\CHPT1.DOC | 03 | 6 | TRUE |

DIRECTORY ENTRY ALLOCATION BITMAP

| 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|
| 1 | 1 | 1 | 1 | 1 | 1 | 1 | 1 | 1 | 0 | 0 | 0 | 0 | 0 | 0 | 0 |

↓ CHPT1.TMP CREATED
CHANGE TO DIRECTORY TREE
AND CHANGE TO ALLOCATION

SCAN RESULTS

| INODE | 1ST CLUSTER | SIZE | SCANNED |
|---|---|---|---|
| ...\CHPT1.DOC | 03 | 6 | TRUE |
| ...\CHPT1.TMP | 10 | 3 | TRUE |

DIRECTORY ENTRY ALLOCATION BITMAP

| 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|
| 1 | 1 | 1 | 1 | 1 | 1 | 1 | 1 | 1 | 0 | 1 | 1 | 1 | 0 | 0 | 0 |

↓ CHPT1.TMP DELETE = åHPT1.TMP
CHANGE TO DIRECTORY TREE AND
NO CHANGE TO ALLOCATION

DIRECTORY ENTRY ALLOCATION BITMAP

| 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|
| 1 | 1 | 1 | 1 | 1 | 1 | 1 | 1 | 1 | 0 | 1 | 1 | 1 | 0 | 0 | 0 |

↓ åHPT1.TMP FREED
NO CHANGE TO DIRECTORY TREE
AND
CHANGE TO ALLOCATION

DIRECTORY ENTRY ALLOCATION BITMAP

| 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|
| 1 | 1 | 1 | 1 | 1 | 1 | 1 | 1 | 1 | 0 | 0 | 0 | 0 | 0 | 0 | 0 |

FIG. 8A

CHPT1.DOC REDUCED
NO CHANGE TO DIRECTORY TREE
AND
CHANGE TO ALLOCATION

DIRECTORY ENTRY ALLOCATION BITMAP

| 00 | 01 | 02 | 03 | 04 | 05 | 06 | 07 | 08 | 09 | 10 | 11 | 12 | 13 | 14 | 15 |
|----|----|----|----|----|----|----|----|----|----|----|----|----|----|----|----|
| 1  | 1  | 1  | 1  | 1  | 1  | 1  | 0  | 0  | 0  | 0  | 0  | 0  | 0  | 0  | 0  |

CHPT2.DOC CREATED
CHANGE TO DIRECTORY TREE
AND
CHANGE TO ALLOCATION

SCAN RESULTS

| INODE | 1ST CLUSTER | SIZE | SCANNED |
|---|---|---|---|
| ...\CHPT1.DOC | 03 | 4 | TRUE |
| ...\CHPT2.DOC | 14 | 1 | TRUE |

DIRECTORY ENTRY ALLOCATION BITMAP

| 00 | 01 | 02 | 03 | 04 | 05 | 06 | 07 | 08 | 09 | 10 | 11 | 12 | 13 | 14 | 15 |
|----|----|----|----|----|----|----|----|----|----|----|----|----|----|----|----|
| 1  | 1  | 1  | 1  | 1  | 1  | 1  | 0  | 0  | 0  | 0  | 0  | 0  | 0  | 1  | 0  |

SYSTEMS AND METHODS FOR RECOVERING LOST CLUSTERS FROM A MOUNTED VOLUME

RELATED APPLICATIONS

This application claims the benefit of U.S. Provisional Application No. 62/424,344, filed on Nov. 18, 2016, which is incorporated by reference in its entirety.

TECHNICAL FIELD

This disclosure relates to systems and methods for use with file systems and more particularly to techniques for recovering lost clusters.

BACKGROUND

Devices including laptop or desktop computers, tablet computers, televisions, digital video recorders, set-top boxes, digital media players, video gaming devices, and cellular telephones may utilize file systems to control how data is stored on and retrieved from a computer readable medium. For example, a device may read and/or write data to a storage device, such as, a memory card (e.g., a Secure Digital (SD) memory card, including Standard-Capacity (SDSC), High-Capacity (SDHC), and eXtended-Capacity (SDXC) formats, a MultiMediaCard (MMC) including embedded MMC (eMMC), and a Universal Flash Storage (UFS) card), a hard disk drive, and/or a solid state drive including a Universal Serial Bus (USB) solid state drive (so-called "flash," "thumb," or "jump" drives) according to a defined file system. Types of file systems include, for example, file systems based on the Extended File System (ext), file systems based on the Hierarchical File System (HFS), file systems based on the XFS file system, file systems based on the Z File System (ZFS), file systems based on the New Technology File System (NTFS), and file systems based on File Allocation Table (FAT) file systems, including the FAT12, FAT16, FAT32, exFAT, and transactional exFAT file systems. Current techniques for recovering lost clusters in a file system may be less than ideal.

SUMMARY

In general, this disclosure describes techniques for recovering lost clusters. In particular, this disclosure describes techniques for generating an allocation bitmap. The allocation bitmap may be used to recover lost clusters on a mounted volume.

According to one example of the disclosure, a method for generating an allocation bitmap, comprises receiving a volume including a directory table, reading one or more directory entries included within the directory table, generating an allocation bitmap based on the read directory entries, prior to reading all of the directory entries included within the directory table, determining that a change occurs to a data object included in the volume, and modifying the allocation bitmap based on the change to the data object.

According to another example of the disclosure, a device comprises one or more processors configured to receive a volume including a directory table, read one or more directory entries included within the directory table, generate an allocation bitmap based on the read directory entries, determine that a change occurs to a data object included in the volume, prior to reading all of the directory entries included within the directory table, and modifying the allocation bitmap based on the change to the data object.

According to another example of the disclosure, a non-transitory computer-readable storage medium comprises instructions stored thereon, that upon execution, cause one or more processors of a device to receive a volume including a directory table, read one or more directory entries included within the directory table, generate an allocation bitmap based on the read directory entries, determine that a change occurs to a data object included in the volume, prior to reading all of the directory entries included within the directory table, and modifying the allocation bitmap based on the change to the data object.

According to another example of the disclosure, an apparatus comprises means for receiving a volume including a directory table, means for reading one or more directory entries included within the directory table, means for generating an allocation bitmap based on the read directory entries, prior to reading all of the directory entries included within the directory table, means for determining that a change occurs to a data object included in the volume, and modifying the allocation bitmap based on the change to the data object.

The details of one or more examples are set forth in the accompanying drawings and the description below. Other features, objects, and advantages will be apparent from the description and drawings, and from the claims.

BRIEF DESCRIPTION OF DRAWINGS

FIGS. 8A-8B are a conceptual diagrams illustrating examples of scan results in according to one or more techniques of this disclosure.

DETAILED DESCRIPTION

Figure 1:
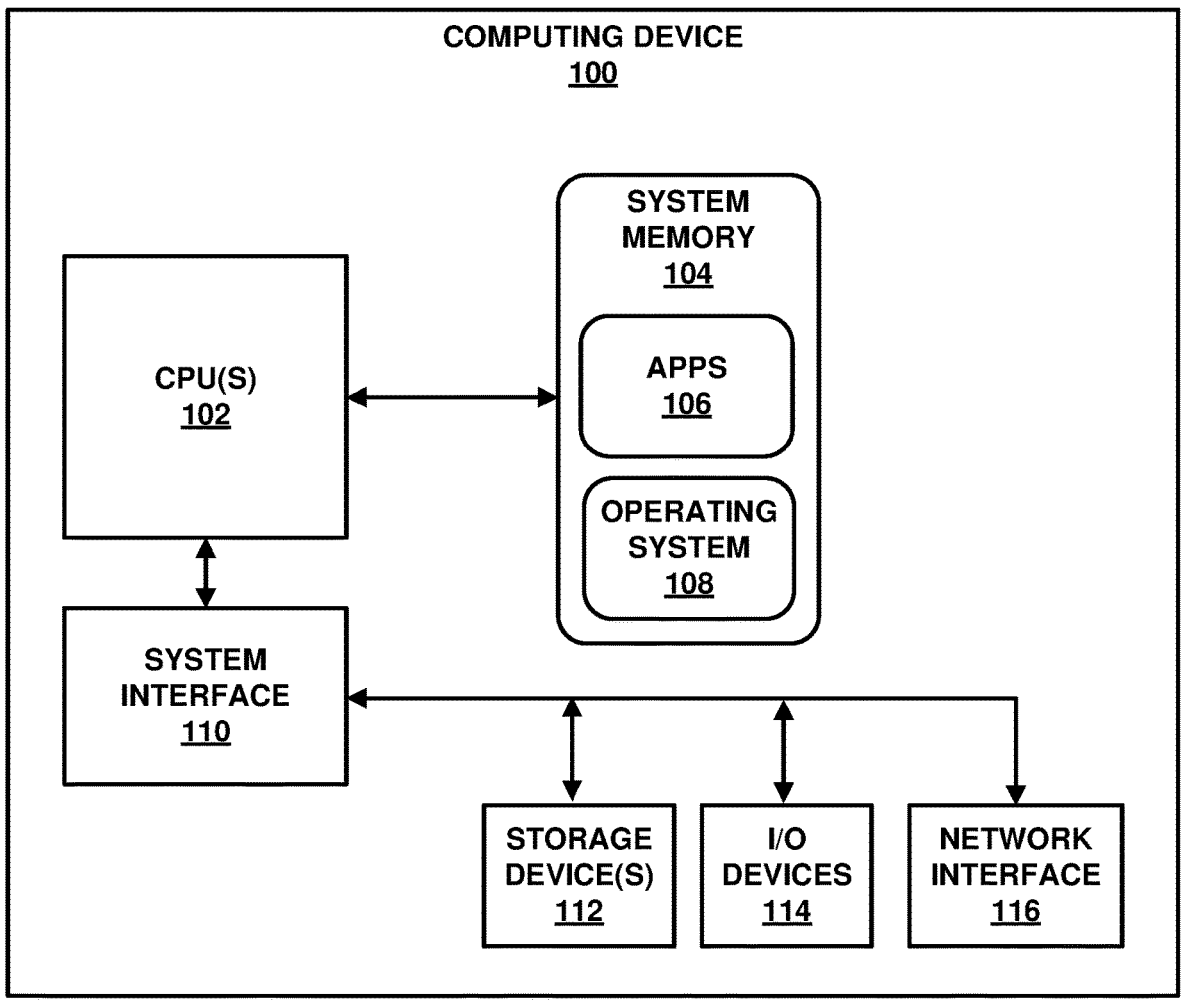
FIG. 1 is a block diagram illustrating an example of a computing device that may implement one or more techniques of this disclosure.

In general, this disclosure describes techniques for recovering lost clusters. In one example, the techniques described herein may be used to recovery lost clusters from a mounted volume. In particular, the techniques described herein ensure that changes to a the volume, including changes based on data objects being modified, are reflected in an allocation bitmap. That is, an allocation bitmap may be created and modified concurrently with changes to a volume occurring. The allocation bitmap may be compared to a logical allocation structure to determine if any lost clusters exist. The lost clusters may be recovered.

User data may be arranged, organized, and/or managed on a storage device according to a defined file system. A file system may specify the structure and requirements of a volume, where a volume is a set of logical structures defined for a data space necessary to store and retrieve user data. A volume may include boot record(s), file allocation table(s) (FATs), other data structures (e.g., allocation bitmaps and journals), and user data. User data may include directories and files, and/or similar data structures. Each of a directory, file, and/or similar data structures may generally be referred to as a data object or data item. In Unix based file systems, the term Mode may be used to refer to a file or a directory data object. As used herein, the term Mode may more generally refer to a data object associated with user data. Modes may be represented as directory entries included in a directory tree or table. Directory entries may include fields identifying properties of the Mode they represent. Data that forms an Mode may be physically stored to one or more sectors of a storage device. File systems may define a cluster (or allocation unit) according to a number of sectors, where a cluster is the smallest logical unit of memory that can be allocated to a data object. Thus, one or more clusters are allocated to each data object stored on a storage device. File allocation table(s), allocation bitmap(s), and/or similar logical structures within a file system provide a mapping of data objects to one or more allocated clusters, and as such may be referred to as allocation mapping structures. As described in further detail below, file system drivers may allow an application and/or processes associated with an application to cause data objects to be modified on a storage device.

When data objects are modified on a storage device, directory entries and allocation mapping structures may become inconsistent. For example, as described in further detail below, a file may be initially allocated 10 clusters and as such, a file size field in a directory entry may indicate that a file is allocated 10 clusters and a file allocation table may provide a 10 cluster chain for the file. As additional clusters are allocated to the file (e.g., a user causing more data to be written to the file), the cluster chain may be expanded (e.g., from 10 clusters to 12 clusters), before the file size is updated in the directory entry. In this case, failures, such as, a power failure or a storage device being removed, may cause the directory tree and the allocation mapping structures to remain inconsistent. Lost clusters refer to clusters which are marked as allocated in an allocation mapping structure, but are not actually referenced by any Modes (files/directories). For example, lost clusters may occur when a file is reduced in size (e.g., slides are removed from a presentation) and clusters are deallocated in a file allocation table prior to a directory entry being updated. Lost clusters are problematic as they are not available for use until they are freed. Another type of inconsistency between directory entries and allocation mapping structures includes so-called open unlinked files. Open unlinked files may refer to a file that is created by an application, allocated clusters, and subsequently deleted from a directory table, while the application continues to use the file (i.e., file remains open by an application and/or the application still uses the allocated clusters).

In some cases, lost clusters may be identified and, optionally freed, by running a file system check (fsck) utility in Linux or a check disk utility (chkdsk) in Windows. It should be noted that the fsck operation and the chkdsk operation are performed on an unmounted file system and are relatively time consuming That is, the fsck operation and the chkdsk operation cannot be performed concurrently with data objects in a volume being modified. For example, in the event a user wishes to scan a storage device for lost clusters after a system failure, the scan may take at least numerous minutes to complete, and as such the user may not be able to access data on the storage device until the scan is completed. Recovering lost clusters in this manner may be less than ideal.

FIG. 1 is a block diagram illustrating an example of a computing device that may implement one or more techniques of this disclosure. Computing device 100 may include one or more processors and a plurality of internal and/or external storage devices. Examples of storage devices include file servers, File Transfer Protocol (FTP) servers, network attached storage (NAS) devices, a local disk drive, removable memory devices, such as, for example, memory cards and USB memory devices, or any other type of device or storage medium capable of storing data. A storage medium may include an optical storage medium (e.g., DVDs, CD-ROMs, etc.), a magnetic storage medium, a flash memory, or any other suitable digital storage media. When the techniques described herein are implemented partially in software, a device may store instructions for the software in a suitable, non-transitory computer-readable medium and execute the instructions in hardware using one or more processors.

Computing device 100 is an example a computing device configured to store data on or retrieve data from a computer readable medium. Data may include, for example, application files, document files, media files (audio and/or video files), and the like. Computing device 100 may be equipped for wired and/or wireless communications and may include devices, such as, for example, desktop or laptop computers, mobile devices, smartphones, cellular telephones, tablet devices, set top boxes, DVRs, surveillance systems, personal gaming devices, drones, and automotive infotainment systems. As illustrated in FIG. 1, computing device 100 includes central processor unit(s) 102, system memory 104, system interface 110, storage device(s) 112, input/output (I/O) device(s) 114, and network interface 116. As illustrated in FIG. 1, system memory 104 includes applications (apps) 106 and operating system 108. It should be noted that although example computing device 100 is illustrated as having distinct functional blocks, such an illustration is for descriptive purposes and does not limit computing device 100 to a particular hardware or software architecture. Functions of computing device 100 may be realized using any combination of hardware, firmware and/or software implementations.

Central processing unit(s) 102 may be configured to implement functionality and/or process instructions for execution in computing device 100. Central processing unit(s) 102 may be capable of retrieving and processing instructions, code, and/or data structures for implementing one or more of the techniques described herein. Instructions may be stored on a computer readable medium, such as system memory 104 or storage device(s) 112. Central processing unit(s) 102 may include digital signal processors (DSPs), general purpose microprocessors, application specific integrated circuits (ASICs), field programmable logic arrays (FPGAs), or other equivalent integrated or discrete logic circuitry. Central processing unit(s) 102 may include one or more multi-core central processing units. Central processing unit(s) 102 may operate according to a page size, where a page includes a fixed-length contiguous block of virtual memory. A common page size for central processing unit architectures is 4096 bytes (i.e., 4 kilobytes (kiB)). Other example page sizes may include 8 kiB, 16 kiB, 32 kiB, 64 kiB, etc.

System memory 104 may be configured to store information that may be used by computing device 100 during operation. System memory 104 may be described as a non-transitory or tangible computer-readable storage medium. In some examples, system memory 104 may provide temporary memory and/or long-term storage. In some examples, system memory 104 or portions thereof may be described as non-volatile memory and in other examples portions of system memory may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. In one example, system memory 104 may include an internal hard disk drive and/or an internal flash memory.

System interface 110 may be configured to enable communications between components of computing device 100. In one example, system interface 110 comprises structures that enable data to be transferred from one peer device to another peer device or to a storage medium. For example, system interface 110 may include a chipset supporting Peripheral Component Interconnect (PCI), Peripheral Component Interconnect Express (PCIe) bus protocols, proprietary bus protocols, or any other form of structure that may be used to interconnect peer devices.

Storage device(s) 112 represent memory of computing device 100 that may be configured to store different amounts of information for different periods of time than system memory 104. Similar to system memory 104, storage device(s) 112 may also include one or more non-transitory or tangible computer-readable storage media. Storage device(s) 112 may be internal or external memory and in some examples may include non-volatile storage elements. Storage device(s) may include memory cards (e.g., a Secure Digital (SD) memory card, including Standard-Capacity (SDSC), High-Capacity (SDHC), and eXtended-Capacity (SDXC) formats, a MultiMediaCard (MMC) including embedded MMC (eMMC), and a Unverisal Flash Storage (UFS) card), external hard disk drives, and/or an external solid state drive. Data stored on storage device(s) 112 may be stored according to a defined file system, such as, for example FAT12, FAT16, FAT32 and/or proprietary file systems, including file systems based on the techniques described herein.

I/O device(s) 114 may be configured to receive input and provide output for computing device 100. Input may be generated from an input device, such as, for example, a touch-sensitive screen, a track pad, a track point, a mouse, a keyboard, a microphone, one or more video cameras, or any other type of device configured to receive input. Output may be provided to output devices, such as, for example, speakers or a display device. In some examples, I/O device(s) 114 may be external to computing device 100 and may be operatively coupled to computing device 100 using a standardized communication protocol, such as for example, Universal Serial Bus protocol (USB).

Network interface 116 may be configured to enable computing device 100 to communicate with external computing devices via one or more networks. Network interface 116 may be a network interface card, such as an Ethernet card, an optical transceiver, a radio frequency transceiver, or any other type of device that can send and receive information. Network interface 116 may be configured to operate according to one or more communication protocols such as, for example, a Global System Mobile Communications (GSM) standard, a code division multiple access (CDMA) standard, a 3rd Generation Partnership Project (3GPP) standard, an Internet Protocol (IP) standard, a Wireless Application Protocol (WAP) standard, and/or an IEEE standard, such as, one or more of the 802.11 standards, as well as various combinations thereof.

As illustrated in FIG. 1, system memory 104 includes applications 106 and operating system 108. Applications 106 may include any applications implemented within or executed by computing device 100 and may be implemented or contained within, operable by, executed by, and/or be operatively/communicatively coupled to components of computing device 100. Applications 106 may include instructions that may cause central processing unit(s) 102 of computing device 100 to perform particular functions. Applications 106 may cause central processing unit(s) 102 to write data to or read data from a computer readable medium, such as for example, system memory 104 and/or storage device(s) 112. Applications 106 may include algorithms which are expressed in computer programming statements, such as, for loops, while-loops, if-statements, do-loops, etc.

As further illustrated in FIG. 1, applications 106 may execute on top of operating system 108. Operating system 108 may be configured to facilitate the interaction of applications 106 with central processing unit(s) 102, and other hardware components of computing device 100. Operating system 108 may be an operating system designed to be installed on laptops and desktops. For example, operating system 108 may be a Windows® operating system, Linux, or Mac OS. Operating system 108 may be an operating system designed to be installed on smartphones, tablets, set-top boxes, and/or gaming devices. For example, operating system 108 may be a Windows®, Linux, Mac OS, Android, iOS, Windows Mobile®, or a Windows Phone® operating system. It should be noted that although techniques may be described according to particular example operating systems, the techniques described herein are not limited to a particular operating system.

Figure 2:
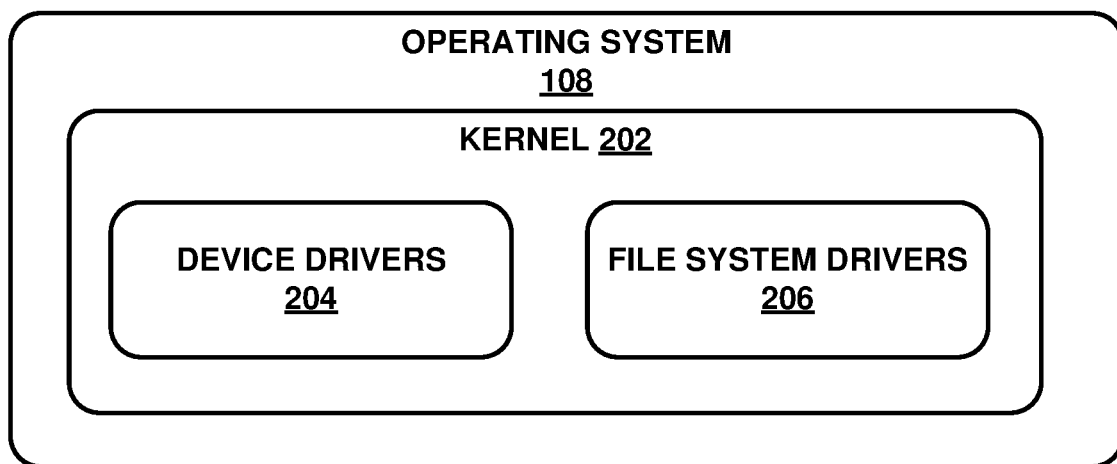
FIG. 2 is a block diagram illustrating an example of an operating system of a computing device that may implement one or more techniques of this disclosure.

FIG. 2 is a block diagram illustrating an example of an operating system of a computing device that may implement one or more techniques of this disclosure. As illustrated in FIG. 2, operating system 108 includes kernel 202. In one example, kernel 202 may be a kernel based on a Linux kernel. In other examples, kernel 202 may be a component or subset of instructions of an operating system. As illustrated in FIG. 2, kernel includes device drivers 204 and file system drivers 206. Device drivers 204 may be configured to operate as an interface between operating system 108 and hardware devices, such as, for example, system interface 110. File system drivers 206 may be configured to provide a layer of abstraction between applications 106 and/or operating system 108 and a storage device, such as, for example system memory 104 and/or storage device(s) 112. For example, file system drivers 206 may allow an application to modify a data object (e.g., in response to user input) on storage device(s) 112 without requiring the application to perform aspects of file management. Modifying a data object may include any type of data change within a volume, from creating, modifying, renaming, moving, or deleting a file to creating, modifying, renaming, moving, or deleting a directory. In one example, file system drivers 206 may be configured to allow data to be stored to system memory 104 and/or storage device(s) 112 according to a file system based on a File Allocation Table (FAT) file system according to the techniques described herein. It should be noted that in some examples, file system drivers 206 may be implemented as one driver binary that implements multiple file systems (e.g., both FAT and exFAT file systems). In other examples, file system drivers 206 may include a separate binary driver for respective file systems. Further, operating system 108 and/or file system drivers 206 may further be configured to examine storage devices, such as, for example, storage device(s) 112, and correct errors.

Figure 3:
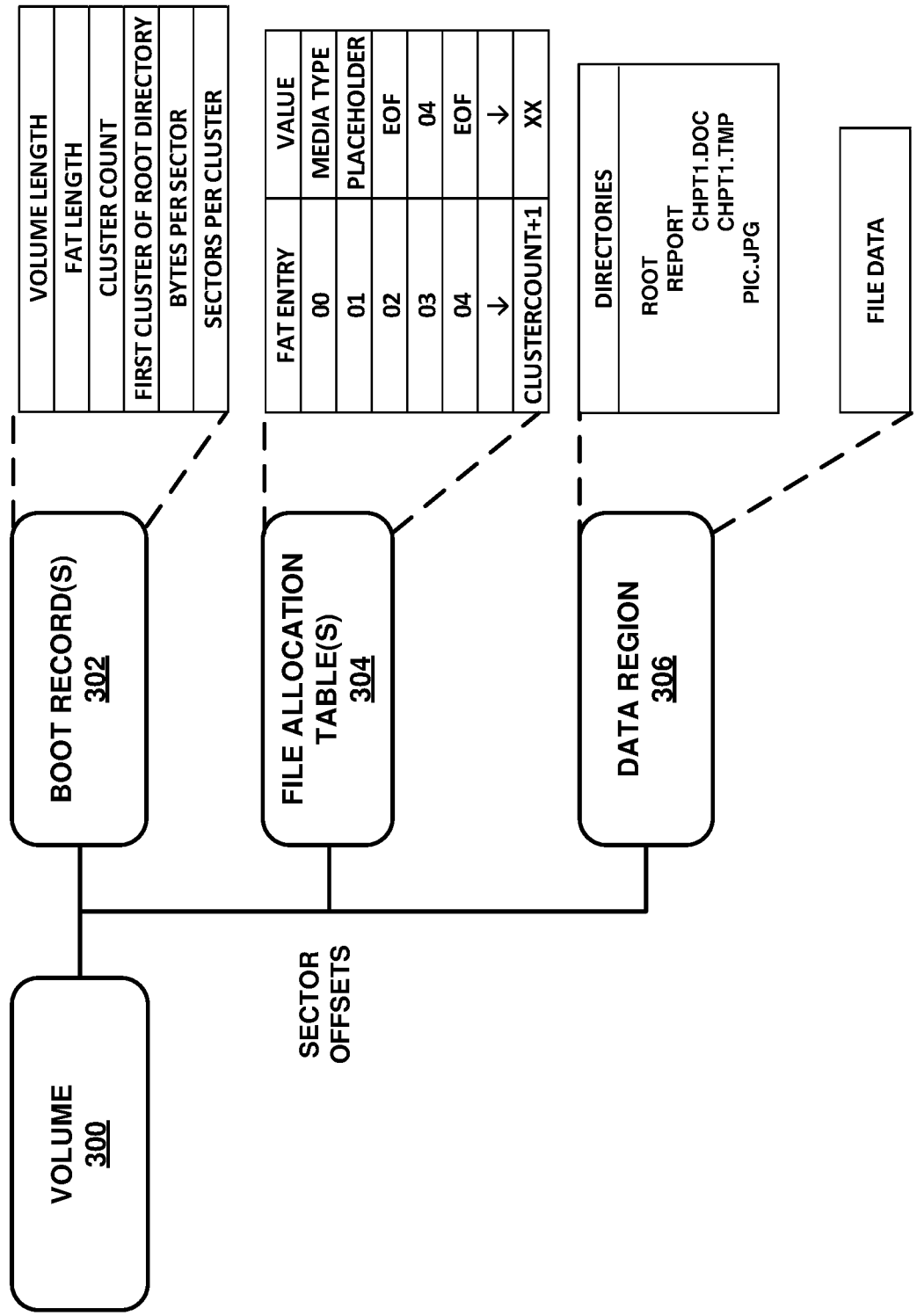
FIG. 3 is a conceptual diagram illustrating an example of a volume defined according to an example file system.

FIG. 3 is a conceptual diagram illustrating an example of a volume defined according to an example file structure. Examples of file systems include the so-called file allocation table (FAT) file systems (e.g., FAT12, FAT16, FAT32, and exFAT.) The FAT32 file system is described in the Microsoft Extensible Firmware Initiative FAT32 File System Specification (version 1.03 Dec. 6, 2000), which is incorporated by reference in its entirety. Microsoft exFAT Revision 1.00 File System Basic Specification (fourth release, 1 Jan. 2009), which is described in Appendix A of U.S. Pat. No. 8,321,439, and which is herein incorporated by reference in its entirety, defines aspects of the exFAT file system. A file system may specify the structure and requirements of a volume, where a volume is a set of file system structures and data space necessary to store and retrieve user data. As described in detail below with respect to FIG. 3, a volume may include boot record(s), file allocation table(s), and a data region.

In one example, volume 300 may be defined according to a FAT file system (e.g., FAT12, FAT16, and FAT32), including FAT file systems implementing the techniques described herein. It should be noted that although in some examples volume 300 is described with respect to a FAT file system, the techniques described herein are not necessarily limited to an FAT file systems and may be used with other file systems. Further, it should be noted that example volume 300 represents an illustrative example of a volume and, for the sake of brevity, is not intended as an exhaustive description of a volume defined according to a file system. Additional details of a volume may be found in a corresponding file system specification. For example, in the case where volume 300 is defined according to a file system based on the one or more of the FAT12, FAT16, and FAT32 file systems, additional details of volume may be found in the Microsoft Extensible Firmware Initiative FAT32 File System Specification (version 1.03 Dec. 6, 2000).

In the example illustrated in FIG. 3, volume 300 includes boot record(s) 302, file allocation table(s) 304, and data region 306. Each of boot record(s) 302, file allocation table(s) 304, and data region 306 may be addressable on a storage device, such as, and for example, storage device(s) 112, according to a sector value. Boot record(s) 302 include data entries describing file system parameters. In one example, boot record(s) 302 include data for bootstrapping the volume, fundamental file system parameters for the volume, and various error checking information. Boot record(s) 302 may include one or more boot records. In one example, boot record(s) 302 include a primary boot record and a backup boot record, where the backup boot record is a replica of the primary boot record. As illustrated in FIG. 3, examples of information included in boot record(s) 302 include volume length, file allocation table length, cluster count, first cluster of root directory, bytes per sector, and sectors per cluster. In one example, volume length specifies the size of the volume 300 in sectors. In one example, file allocation table length specifies the size of a file allocation table 304 in sectors. In one example, cluster count specifies the number of clusters included in data region 306. It should be noted that although not illustrated in FIG. 3, boot record(s) 302 may also include information indicating a percentage of clusters which are allocated and information that allows volume 300 to be boot-strapped. Boot record(s) 302 may be updated as files and directories are modified. In one example, first cluster of root directory specifies a sector location of the root directory in data region 306.

In one example, bytes per sector specifies the number of bytes included in a sector. In one example, the number of bytes per sector may be expressed in power of 2 notation and may range from a minimum of 512 bytes per sector to a maximum of 4096 bytes per sector. In one example, sectors per cluster specifies the number of sectors per cluster. In one example, the minimum number of sectors per cluster may be one and the maximum number of sectors per cluster may provide for a maximum cluster size of 32 kiB. It should be noted that, in some examples, the size of a cluster may be dependent on the volume size and/or an operating system. For example, for standard compliant FAT volumes for the largest volumes, defined as volumes greater than 32 Gigabytes (GiB) (where 1 GiB is $1,024^3$ bytes), the cluster size would be the maximum cluster size for FAT, which is 32 kiB (e.g., 64 sectors of 512 bytes or 8 sectors of 4096 bytes). A standard compliant 32 GiB FAT volume would use clusters having a size of 16 kiB. A standard compliant 16 GiB FAT volume would use 8 kiB clusters. A standard compliant 8 GiB FAT volume would use 4 kiB clusters. It should be noted that FAT32 supports clusters larger than 32 kiB in some cases. For example, cluster sizes of 128 kiB and 256 kiB may be supported for sector sizes larger than 512 bytes.

File allocation table(s) 304 may include one or more file allocation tables. In one example, file allocation table(s) 304 includes a single file allocation table 304. In another example, file allocation table(s) 304 includes two or more file allocation tables. File allocation table(s) 304 may be used to describe a sequence of clusters (also, referred to as a chain of clusters) that are allocated to a data object, such as a file, in data region 306. As illustrated in FIG. 3, a file allocation table may include an entry and a value corresponding to the entry. In the example illustrated in FIG. 3, entry 00 includes a value indicating a media type and entry 01 includes a placeholder value. Entries 02 through ClusterCount+1 may provide information describing sequences of clusters allocated to a data object. In one example, entries may include a value indicating a subsequent cluster entry in a sequence of clusters, a value indicating a "bad" cluster, a value indicating that the cluster is not in use, or a value indicating the end of a sequence of clusters (EOF).

In the example illustrated in FIG. 3, root file directory begins at cluster 02. As illustrated in FIG. 3, entry 02 includes an EOF marker which indicates that the root directory is not assigned any additional clusters. As illustrated in FIG. 3, entry 03 includes an address of 04, indicating that the next cluster in the sequence for the data object is cluster 04. Entry 04 includes an EOF marker which indicates that the data object is not allocated any additional clusters. In this manner, file allocation table(s) may be used to identify a sequence of clusters allocated to a data object. It should be noted that although in the example illustrated in FIG. 3 that the clusters allocated to an data object are consecutive, in other examples, clusters allocated to an data object may include clusters that are not consecutive (e.g., entry 03 pointing to entry 07, etc.).

Data region 306 may be the region of volume 300 where data that makes up a data object is stored. In some examples, data region 306 may be referred to a cluster heap. Data region 306 may include data objects representing one or more types of files. For example, data region 306 may include a word processing document, such as, for example, a Microsoft Word document, media files, such as, for example, a JPEG file, video files, and/or other types of files. As described above, information regarding the configuration of data region 306 may be included in boot record(s) 302 (e.g., cluster count and percentage of clusters allocated). It should be noted that in most cases, boot record(s) 302 are typically updated on a mounting event. As further described above, a modification to a data object stored in data region 306 may require file allocation table(s) 304 to be updated. As illustrated in FIG. 3, data region includes directory table and file data. As described above, a directory table may include entries describing a tree structure which indicates a relationship between files and directories. For example, directory table may indicate that a particular file is stored in a sub-directory of a parent directory.

In the example illustrated in FIG. 3, directory table includes a root directory and a "REPORT" directory. As further illustrated in FIG. 3, a document file ("CHPT1.DOC") is included within the "REPORT" directory and temporary file ("CHPT1.TMP") associated with CHPT1.DOC is included within the "REPORT" directory. In the example illustrated in FIG. 3, the root directory may include general information about the volume and the data region. It should be noted that directory entries may include one or more records of different types as defined according to a file system. One or more records may map a data object to a data region. For example, a first cluster field in a record may provide an initial mapping of a file to one or more clusters of data. As data objects stored to a volume are modified, the records may be updated. File data may include data representing a file, such as, for example, CHPT1.DOC in the example of FIG. 3.

Figure 4:
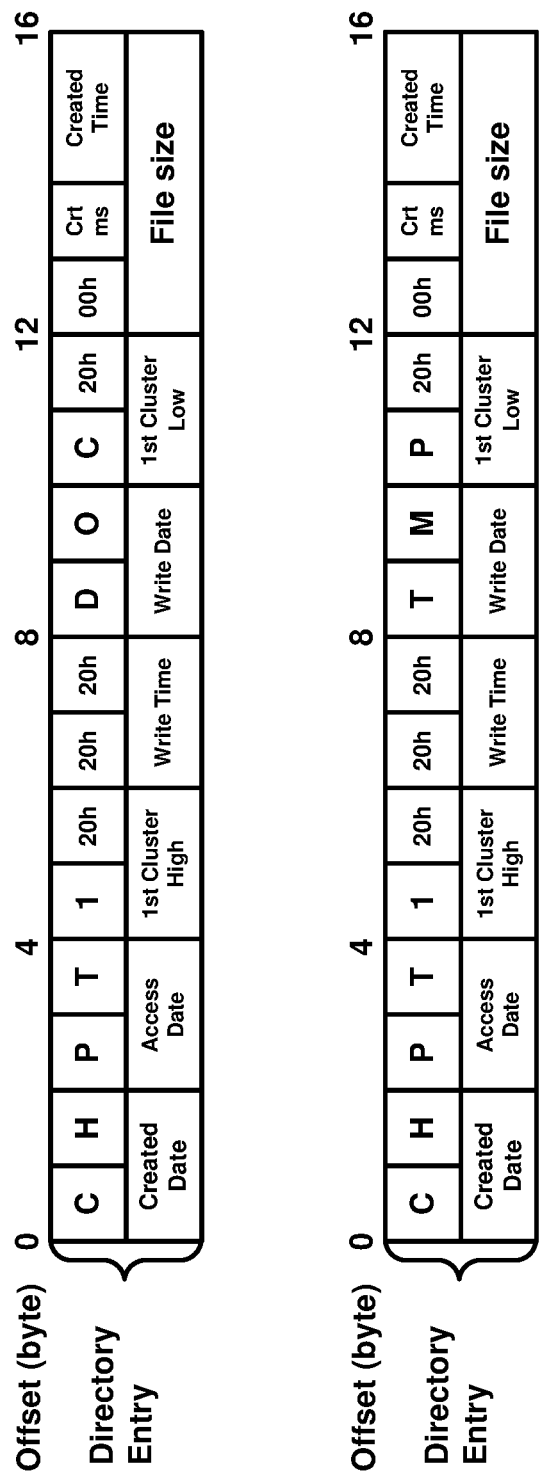
FIG. 4 is a conceptual diagram illustrating examples of directory entries that include records associated with Modes.

As described above, directory entries included in a directory table may include one or more records of different types. FIG. 4 is a conceptual diagram illustrating examples of directory entry record formats according to one or more techniques of this disclosure. The example directory entries illustrated in FIG. 4 corresponds to a directory record defined according to FAT12, FAT16, and FAT32. Referring to FIG. 4, the directory entries include a 32-byte directory entry records (which may be referred to as a short directory entry record) for each of CHPT1.DOC and CHPT1.TMP. Table 1 provides a summary of the directory entry structure for short directory entries according to FAT32. It should be noted that for the sake of brevity a complete description of the directory entry structure for short directory entries and the directory entry structure for long directory entries according to FAT32 are not provided herein. However, reference is made to the Microsoft Extensible Firmware Initiative FAT32 File System Specification (version 1.03 Dec. 6, 2000). Further, it should be noted that in some examples, directory entries may be defined according to a file system based on the exFAT file system, additional details of directory entry for exFAT may be found in the Microsoft exFAT Revision 1.00 File System Basic Specification (fourth release, 1 Jan. 2009).

TABLE 1

| Name | Offset (byte) | Size (bytes) | Description |
| --- | --- | --- | --- |
| DIR_Name | 0 | 11 | Short name character values |
| DIR_Attr | 11 | 1 | File attributes flags. |
| DIR_NTRes | 12 | 1 | Reserved for Windows NT. Set to 0 when file is created. |
| DIR_CrtTimeTenth | 13 | 1 | Millisecond stamp at file creation time. |
| DIR_CrtTime | 14 | 2 | Time file was created. |
| DIR_CrtDate | 16 | 2 | Date file was created. |
| DIR_LstAccDate | 18 | 2 | Last access date. |
| DIR_FstClusHI | 20 | 2 | High word of entry's first cluster number. |
| DIR_WrtTime | 22 | 2 | Time of last write. |
| DIR_WDate | 24 | 2 | Date of last write. |
| DIR_FstClusLO | 26 | 2 | Low word of entry's first cluster number. |
| DIR_FileSize | 28 | 4 | 32-bit unsigned value indicating file's size in bytes. |

As provided in Table 1 and illustrated in FIG. 4, a directory entry identifies the first cluster of a data object and includes a 4 byte field providing the file size. Further, it should be noted that the first bytes of DIR_Name may include a special value indicating that the directory entry is free (0xE5 or 0x00).

Figure 5:
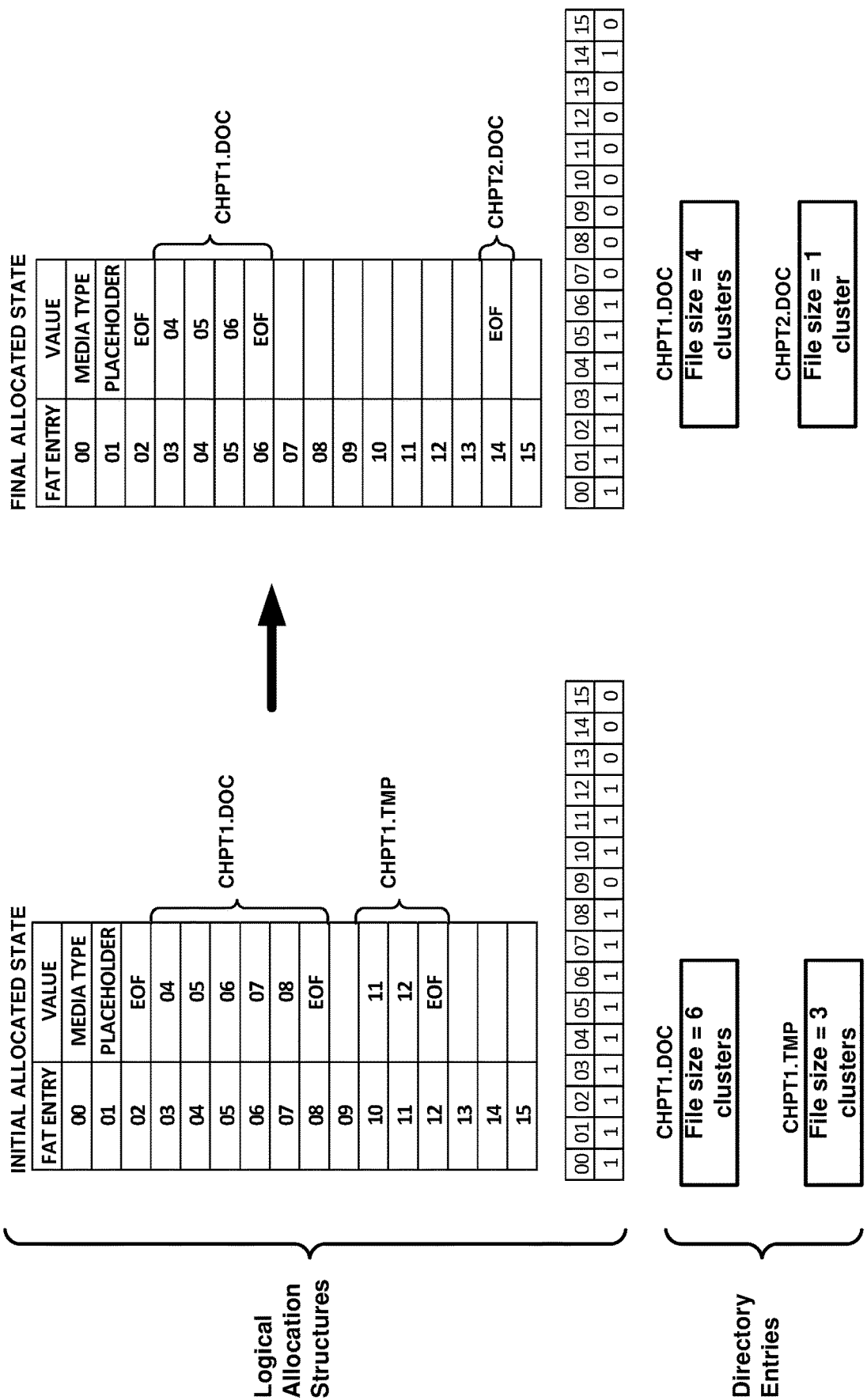
FIG. 5 is a conceptual diagram illustrating an example of modifying logical allocation structures and corresponding directory entries in accordance with one or more techniques of this disclosure.

As described above, operating system 108 and/or file system drivers 206 may be configured to allocate clusters, deallocate clusters, create an Mode, delete an Mode, move an Mode to another directory, and/or rename an Mode. As further described above, such modifications may cause directory entries and allocation mapping structures to become inconsistent. It should be noted that file systems based on exFAT may include an allocation bitmap in addition to a FAT. An allocation bitmap may maintain the allocation state of the clusters in a data region and may be used to determine which clusters in a volume are currently available to write to, i.e., not currently allocated. As illustrated in the example of FIG. 5, allocation bitmap includes an entry corresponding to each cluster of data region, where a binary value of "1" indicates that a particular cluster is allocated and a binary value of "0" indicates that a cluster is unallocated. It should be noted that the techniques described herein may be used with file systems that include an allocation bitmap and file systems that do not include an allocation bitmap.

Figure 6:
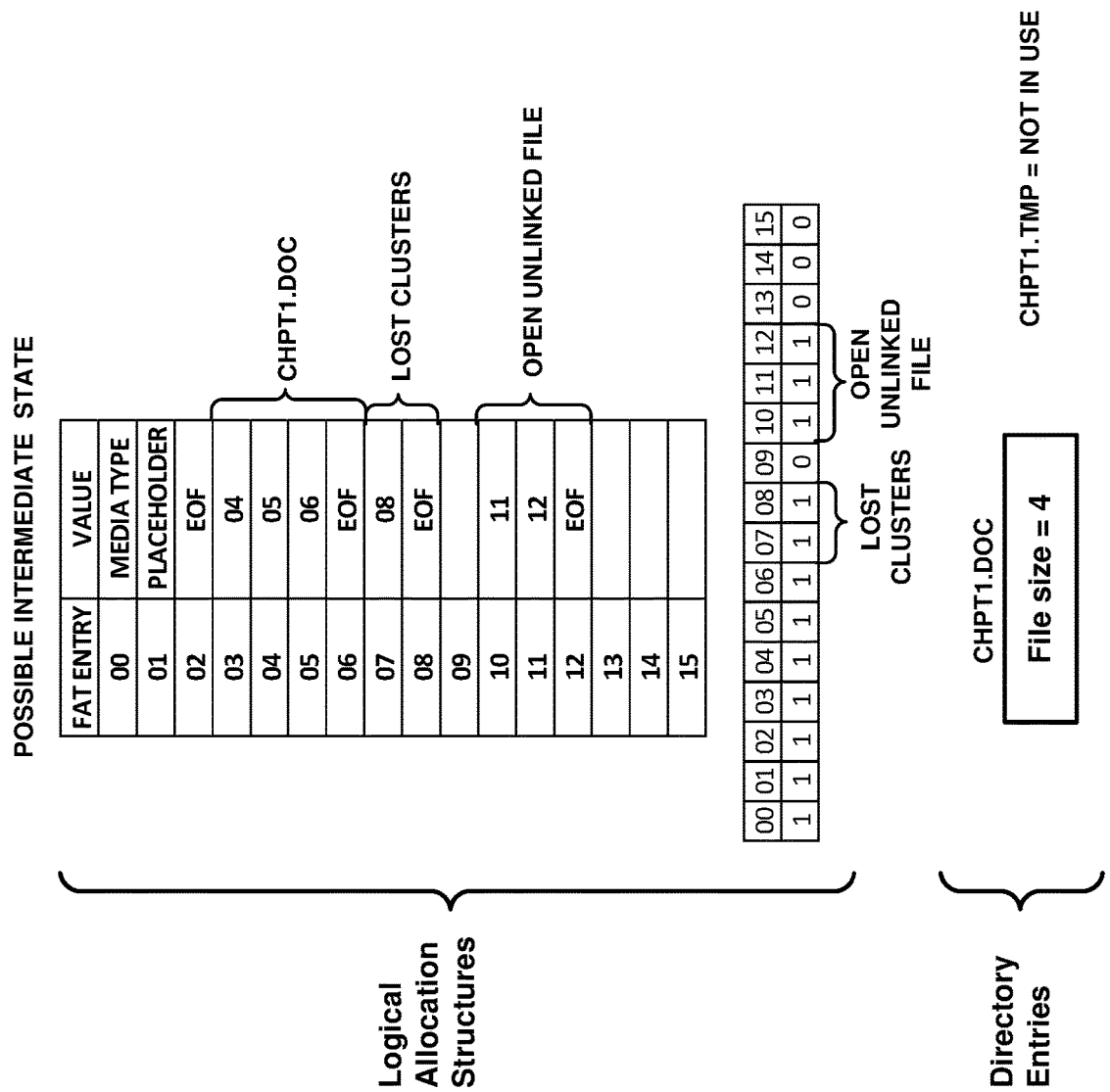
FIG. 6 is a conceptual diagram illustrating an example of an intermediate state that may occur when modifying logical allocation structures and corresponding directory entries in accordance with one or more techniques of this disclosure.

Referring again to FIG. 5, FIG. 5 illustrates an example of logical allocation structures and directory entries at an initial allocated state and at a final allocated state. For example, FIG. 5 may correspond to an example where a user opens and modifies a word document, CHPT1.DOC, and creates a word document, CHPT2.DOC using a word processing application and subsequently closes the word processing application. CHPT1.TMP may represent a temporary file that is created by the word processing application while the user is editing CHPT1.DOC. As illustrated in FIG. 5, CHPT1.TMP is deleted after the word processing application is closed. In some cases, CHPT1.TMP may be an open unlinked file. As described above, inconsistencies between logical allocation structures and directory entries may result in lost clusters. FIG. 6 illustrates an example of an intermediate state between the initial allocated state and the final allocated in FIG. 5. As illustrated in FIG. 6, clusters are deallocated from CHPT1.DOC, (e.g., pages are deleted from the document), which is reflected in the directory entry (e.g., the file size now corresponds to 4 clusters). The deallocation is partially reflected in the FAT as the cluster chain has an end of chain (EOF) inserted in FAT entry 06, but the now lost clusters 07 and 08 are not yet freed in the FAT or in the allocation bitmap (e.g., for volumes with an allocation bitmap, such as exFAT). Further, as illustrated in FIG. 6, CHPT1.TMP is an open unlinked file, (i.e., indicated as not in use in the directory table, but still allocated clusters).

Figure 7:
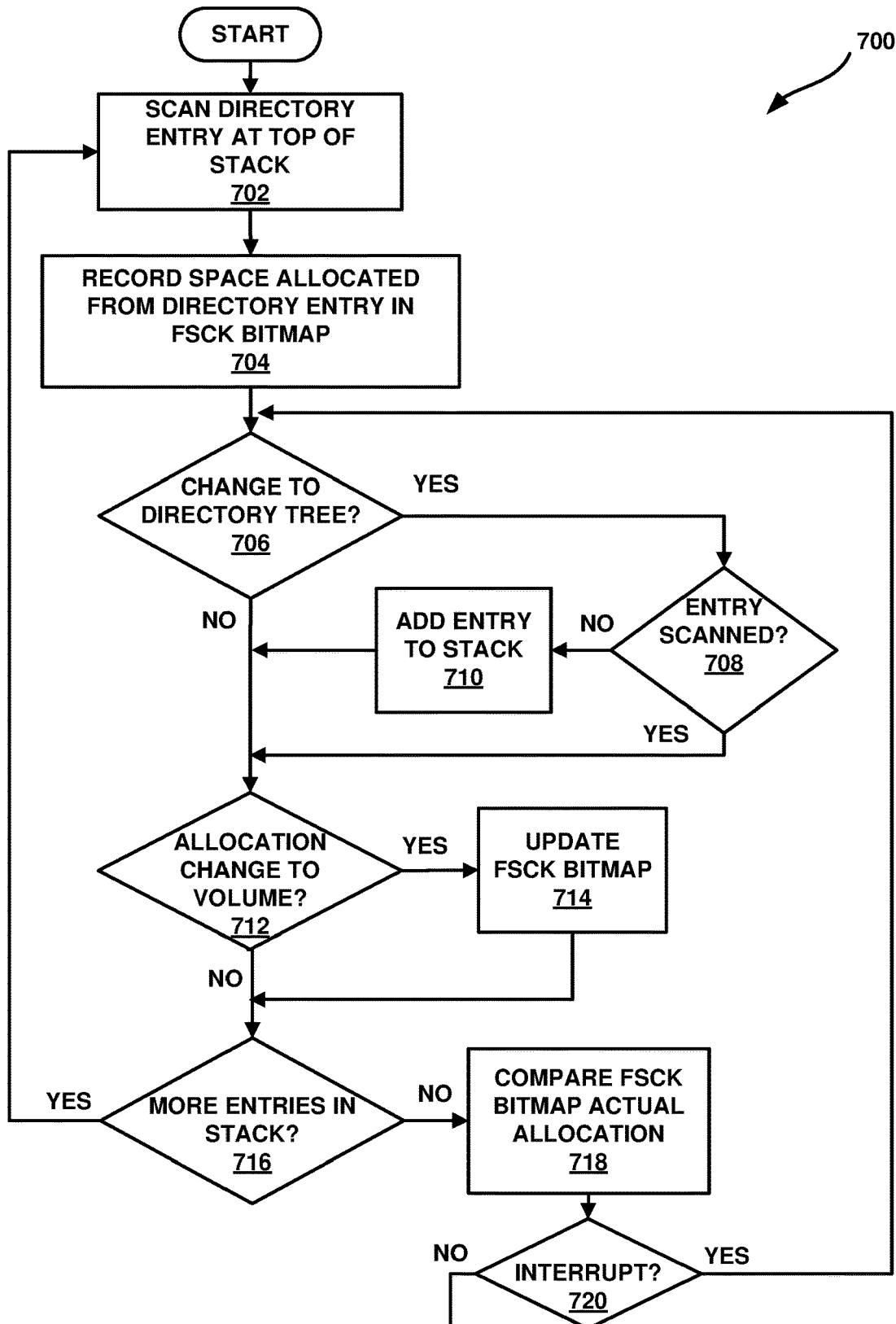
FIG. 7 is a flowchart illustrating an example of recording changes to a volume according to one or more techniques of this disclosure.

As described above, the fsck operation and the chkdsk operation may be performed on an unmounted volume and are relatively time consuming According to the techniques described herein lost clusters may be recovered while a volume is mounted. FIG. 7 is a flowchart illustrating an example of one or more techniques of this disclosure that may be used for recovering lost clusters while a volume is mounted. It should be noted that although flowchart 700 is described with respect to file system driver 206, the techniques illustrated in FIG. 7 may be performed by computing device 100 and any combination of components thereof. Further it should be noted with respect to FIG. 7, functions may be optional, may be combined or subdivided, and operations may vary in sequence or may be combined or subdivided. The techniques illustrated in FIG. 7 may be implemented as a kernel thread that is started in the background with a lower priority, so as to minimize impact on concurrent applications.

At 702, file system driver 206 scans the directory entry at the top of a stack. A stack of directory entries may be formed by walking through a directory table starting from the root. In one example, the stack may be formed using a depth first search directory traversal. That is, the contents of each directory and sub-directories thereof are added to the stack before moving onto the next directory entry at the same level. For example, referring to the example directory table illustrated in FIG. 3, the directory entries corresponding to CHPT1.DOC and CHPT2.DOC would be added to the stack before PIC.JPG. Thus, a depth first approach may work by reading a directory entry and if the directory entry corresponds to a directory scanning the files in the directory. It should be noted that a depth first approach may use less RAM than a breadth first approach by several orders of magnitude.

At 704, file system driver 206 records the space allocated to the directory entry to a directory entry (or fsck) allocation bitmap by reading the directory entry values. For example, in the case of FAT, a first cluster and file size value may be used to determine the clusters that are allocated to the directory entry. FIG. 8A illustrates where CHPT1.DOC is scanned and the directory entry allocation bitmap is updated accordingly (i.e., clusters 03 to 08 are marked as allocated).

Referring again to FIG. 7, as the file system driver 206 is walking through the directory table, the contents of the mounted volume may change. For example, as described above, applications may allocate clusters, deallocate clusters, create an Mode, delete an Mode, move Modes and/or rename an Mode. Changes to the volume may include (1) changes to the directory tree only; (2) changes to the volume allocation only; and (3) changes to both the directory tree and to the volume allocation structures. File system driver 206 may be configured to ensure that any and all of the above changes are reflected in the directory entry allocation bitmap. Referring to FIG. 7, at 706, file system driver 206 may determine whether a change to a directory occurs. For example, file system driver 206 may determine whether a file is renamed, created in a directory, or deleted from a directory. It should be noted that moving a file from one directory to another may be a special case where a file is created in one directory and deleted in another directory. Further, a change to a directory tree may or may not correspond to a change in an allocation to a volume. For example, normal cases of creating and deleting a file would correspond to a change in an allocation to a volume. However, renaming a file, moving a file, and deleting a file from the directory tree, which is an open unlink file, would not necessarily correspond to a change in the allocation.

At 712, file system driver 206 may determine whether a change to the volume allocation has occurred. As illustrated in FIG. 7, at 714, the directory entry (or fsck) allocation bitmap is updated when a change to the volume allocation has occurred regardless of whether a change to the directory tree occurs. FIG. 8B illustrates a case where clusters are deallocated from CHPT1.DOC and the directory entry allocation bitmap is updated accordingly (i.e., clusters 07 to 08 are marked as free). FIG. 8B further illustrates a case where clusters are allocated for CHPT2.DOC and the directory entry allocation bitmap is updated accordingly (i.e., cluster 14 is marked as allocated).

As illustrated in FIG. 7, when a change to a directory occurs, a determination is made whether the entry has been scanned (708). For example, according to the depth first walkthrough described above, when a file is deleted from a directory that has already been scanned, the file has already been scanned. Further, when a file is renamed in directory that has already been scanned, the file has already been scanned. When a file is created, regardless of whether it is created in a directory that has been scanned, the file has not been scanned. It should be noted, however, that in the special case, where a file is moved from a directory that has been scanned (i.e., deleted from an already scanned directory) to a directory that has not been scanned (i.e., created in a directory that has not been scanned), the file has already been scanned. Finally, in the case where the file is deleted from a directory that has not been scanned, the file has not been scanned.

As illustrated in FIG. 7, at 710 when it is determined that a file (i.e., directory entry) has not been scanned, it is added to the stack. In this manner, the entry will be scanned (at 702) and the space allocated will be recorded (at 704) during the next loop. It should be noted that adding files that have not been scanned to the stack may be used to ensure that files that are created in directories that have already been scanned are not missed. Further, adding files that have not been scanned to the stack may be used to ensure that open unlinked files are not missed. For example, if an open unlinked file is deleted from a directory that has not been scanned, file system driver 206 would ensure that the clusters (which are not pointed to in a directory entry) remain in use until they are freed. FIG. 8A illustrates an example, where an open unlinked file CHPT1.TMP is created after CHPT1.DOC has been scanned. That is, as illustrated in FIG. 8A, CHPT1.TMP is created, allocated clusters, deleted, and the allocated clusters remain in use until they are freed. As illustrated in FIG. 8A, when CHPT1.TMP is removed from the directory (i.e, marked as not in use using the character corresponding to 0xE5 in its first name byte), the directory entry allocation bitmap does not indicate that the clusters are free until the application closes the file and the file system driver frees the clusters (e.g., closes the file). In this manner, if a failure were to occur prior to the clusters being freed, then at the next mount the clusters will be found as lost clusters and recovered.

It should be noted that as described above, changes to the volume may include changes to both the directory tree and to the volume allocation structures, e.g., when a file is created in a directory that has not been scanned. It should be noted that in some examples, file system driver 206 may be configured to not add the unscanned entries to the stack, as updating the directory entry allocation bitmap based on the cluster allocation will cause the directory entry allocation bitmap to be up to date and reading the directory entries may be redundant. Further, it should be noted that when a file in a directory that has not been scanned is renamed, the file may be added to the stack and in this manner, file system driver 206 may ensure that if the renamed file is moved to a directory that has already been scanned, the file is not missed.

Referring again to FIG. 7, after all the Modes are scanned (the directory walkthrough is completed), then the directory entry allocation bitmap may be compared to the logical allocation structures. That is, if at 716, it is determined that there are no more entries in the stack, then the comparison at 718 occurs. Examples of comparing the directory entry allocation bitmap to the logical allocation structures include comparing the directory allocation bitmap to a FAT for FAT based file systems or an allocation bitmap for exFAT and NTFS based file systems. When, the directory entry allocation bitmap indicates that a cluster is free, but the logical allocation structures indicate that the cluster is in use, then the cluster represents a lost cluster and may be freed and thus recovered by file system driver 206.

As described above, when the file system driver 206 is walking through the directory table, the contents of the mounted volume may change. In a similar manner, as the file system driver 206 is comparing the directory entry allocation bitmap to the logical allocation structures, the contents of the mounted volume may change. That is, as illustrated in FIG. 7, at 720 an interrupt may occur. In the event of an interrupt, the directory entry allocation bitmap may be updated as described above and the comparison may resume from where it left off. For example, if half of the directory entry allocation bitmap has been processed, the comparison may resume at the second half of the directory entry allocation bitmap. It should be noted that in some examples, interrupts may only occur with respect to allocations in the logical allocation structure that have not been compared to the directory entry allocation bitmap. As described above, the techniques illustrated in FIG. 7 may be implemented as a kernel thread and as such once the comparison is completed the thread may exit. In this manner, computing device represents an example of a device configured to receive a volume including a directory table, read one or more directory entries included within the directory table, generate an allocation bitmap based on the read directory entries, determine that a change occurs to a data object included in the volume, prior to reading all of the directory entries included within the directory table, and modify the allocation bitmap based on the change to the data object.

Figure 9:
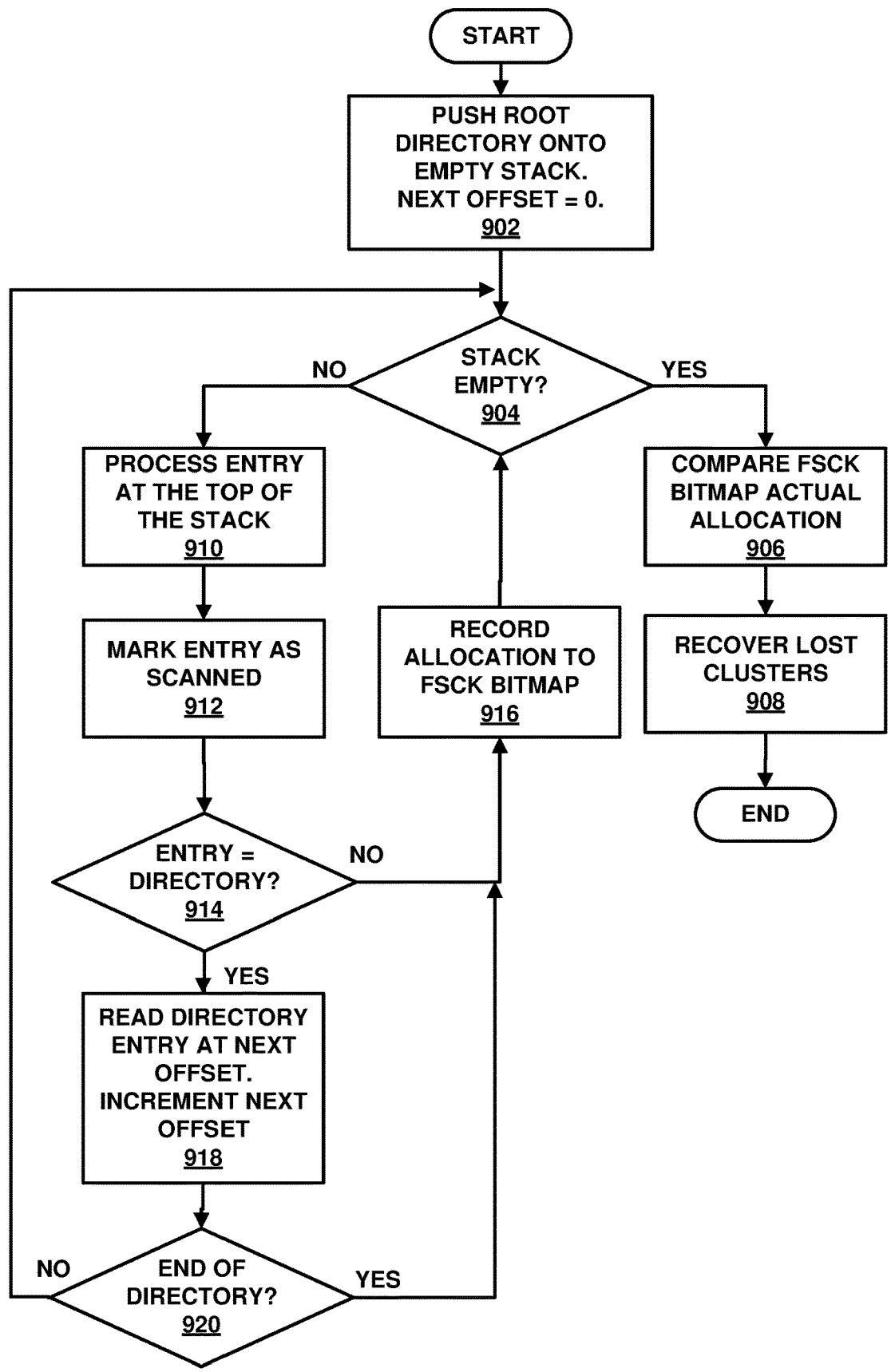
FIG. 9 is a flowchart illustrating an example of an algorithm that may be used to implement one or more techniques of this disclosure.

FIG. 9 is a flowchart illustrated an algorithm that may be used to implement the techniques described herein. In the example illustrated in FIG. 9, a root directory is scanned using a depth first search directory traversal and a resulting directory entry allocation bitmap is created. The directory entry allocation bitmap is compared to a logical allocation structure and lost clusters are recovered. In particular in FIG. 9, a root directory is pushed onto the empty stack and the next offset is set to zero (902). A determination is made whether the stack is empty (904). If the stack is empty, then the directory entry allocation bitmap may be compared to the logical allocation structures (906). Lost clusters are recovered based on the comparison (908). If the stack is not empty, then the directory entry at the top of the stack is processed (910). The process entry is marked as scanned (912). A determination is made whether the entry is a directory (914). If the entry is not a directory, the space allocated to the directory entry is recorded to a directory entry (or fsck) allocation bitmap (916). If the entry is a directory, the directory entry at the next offset is read and the next offset value is incremented (918). As determination is made whether the end of the directory has been reached (920) and the process returns to 904 as illustrated in FIG. 9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for generating an allocation bitmap, the method comprising:
receiving a volume including a directory table;
reading one or more directory entries included within the directory table, wherein the one or more directory entries correspond to one or more data objects;
generating an allocation bitmap based on the read directory entries;
prior to reading all of the directory entries included within the directory table, determining that a change occurs, the change causing additional or fewer clusters to be allocated to a data object included in the volume, where the one or more directory entries corresponding to the data object have been read;
modifying the allocation bitmap based on the change to the data object;
comparing the modified allocation bitmap to a logical allocation structure; and
recovering lost clusters based on the comparison of the modified allocation bitmap to the logical allocation structure.

2. The method of claim 1, wherein a logical allocation structure includes a file allocation table.

3. The method of claim 1, wherein a logical allocation structure includes an allocation bitmap defined according to a file system.

4. The method of claim 1, wherein a change to a data object includes clusters being deallocated from a data object and modifying the allocation bitmap includes indicating in the allocation bitmap that the deallocated clusters are available.

5. The method of claim 4, wherein a logical allocation structure includes an allocation bitmap defined according to a file system.

6. The method of claim 1, wherein reading one or more directory entries included within the directory table includes forming a stack using a depth first search directory traversal.

7. The method of claim 6, wherein the depth first search directory traversal starts at a root and adds contents of each directory and sub-directories thereof to the stack before moving onto the next directory entry at the same level.

8. The method of claim 1, wherein comparing the modified allocation bitmap to a logical allocation structure includes in the event of an interrupt: pausing the comparison, updating the modified allocation bitmap in the event of an interrupt, and after the update is completed, resuming the comparison at the point it was paused.

9. A device comprising one of more processors configured to:
receive a volume including a directory table;
read one or more directory entries included within the directory table;
generate an allocation bitmap based on the read directory entries;
determine that a change occurs to a data object included in the volume, prior to reading all of the directory entries included within the directory table;
modify the allocation bitmap based on the change to the data object;
compare the allocation bitmap to a logical allocation structure; and
recover lost clusters based on the comparison of the allocation bitmap to the logical allocation structure.

10. The device of claim 9, wherein a logical allocation structure includes a file allocation table.

11. The device of claim 9, wherein a logical allocation structure includes an allocation bitmap defined according to a file system.

12. The device of claim 9, wherein a change to a data object includes one of: additional clusters being added to a data object, clusters being deallocated from a data object, a data object corresponding to directory entries that have not been read being renamed, or a data object corresponding to directory entries that have not been read being deleted.

13. The device of claim 9, wherein reading one or more directory entries included within the directory table includes forming a stack using a depth first search directory traversal.

14. The device of claim 9, wherein comparing the modified allocation bitmap to a logical allocation structure includes in the event of an interrupt: pausing the comparison, updating the modified allocation bitmap in the event of an interrupt, and after the update is completed, resuming the comparison at the point it was paused.

15. A non-transitory computer-readable storage medium comprising instructions stored thereon, that upon execution, cause one or more processors of a device to:
receive a volume including a directory table;
read one or more directory entries included within the directory table;
generate an allocation bitmap based on the read directory entries;
determine that a change occurs to a data object included in the volume, prior to reading all of the directory entries included within the directory table;
modify the allocation bitmap based on the change to the data object;
compare the allocation bitmap to a logical allocation structure; and
recover lost clusters based on the comparison of the allocation bitmap to the logical allocation structure.

16. The non-transitory computer-readable storage medium of claim 15, wherein a logical allocation structure includes a file allocation table.

17. The non-transitory computer-readable storage medium of claim 15, wherein a logical allocation structure includes an allocation bitmap defined according to a file system.

18. The non-transitory computer-readable storage medium of claim 15, wherein a change to a data object includes one of: additional clusters being added to a data object, clusters being deallocated from a data object, a data object corresponding to directory entries that have not been read being renamed, or a data object corresponding to directory entries that have not been read being deleted.

19. The non-transitory computer-readable storage medium of claim 15, wherein reading one or more directory entries included within the directory table includes forming a stack using a depth first search directory traversal.

20. The non-transitory computer-readable storage medium of claim 15, wherein comparing the modified allocation bitmap to a logical allocation structure includes in the event of an interrupt: pausing the comparison, updating the modified allocation bitmap in the event of an interrupt, and after the update is completed.

\* \* \* \* \*